Patented Nov. 17, 1936

2,061,099

UNITED STATES PATENT OFFICE 2,061,099

HIGH TEMPERATURE REFRACTORY

John D. Morgan, South Orange, N. J., and Russell E. Lowe, New York, N. Y., assignors to Doherty Research Company, New York, N. Y., a corporation of Delaware No Drawing. Application September 24, 1934, Serial No. 745,290

10 Claims. (Cl. 106—9)

The present invention relates to refractories and a process of making the same, and more particularly to an improved zircon refractory.

Refractories made of zircon and silicon bonded together with phosphoric acid, are disclosed in the U. S. patent of J. D. Morgan, W. G. Bjordstedt and R. E. Lowe, No. 1,811,242. The hereafter described invention is an improvement on such type of refractories.

According to the present invention, electrically fused materials such as alumina ($Al_2O_3$), silicon carbide (SiC), zirconia ($Zr_2O_3$) and chromium oxide ($Cr_2O_3$), are mixed with silicon, zircon and phosphoric acid. Where low temperature hardening is required there is used in addition a small amount of aluminum hydrate powder.

The addition to the silicon and zircon of electrically fused materials gives refractories of superior strength and high thermal conductivity with high electrical resistance. Although the various electrically fused materials have properties in common and may be used interchangeably in the process of manufacture, they also have their individual differences giving to one type of refractory superiority in one field and another type superiority in some other line. The use of alumina gives a refractory material of greater density. The use of silicon carbide, due to its larger crystals, bonds together with the zircon and silicon to give a refractory of greater strength as well as higher thermal conductivity accompanied by high electrical resistance. This silicon carbide-zircon-silicon refractory material is referred to broadly in applicant Morgan's copending application Serial No. 541,227 for an Electric range heating unit.

In the following example alumina ($Al_2O_3$) is used as an example but it is to be understood that in its place may be substituted other electrically fused materials such as silicon carbide, zirconia and chromium oxide. Also in place of ferro-silicon the metal silicon may be used.

The mixture employed is as follows:

50 parts of 75% ferro-silicon (through 80 mesh and on 300 mesh screen)
20 parts of fused alumina (through 200 mesh)
29 parts of milled zircon (through 300 mesh)
6 c. c. of 85% ortho-phosphoric acid per 100 grams of above mixture.

According to the preferred method of making the refractory there is obtained a very dense refractory body. An example of this method is as follows:

Native zircon (zirconium silicate) is milled so that most of the milled material will pass through a 300 mesh screen. Ferro-silicon (preferably 75% silicon) is ground to pass through a screen from 80 to 300 mesh. Then electrically fused refractory material such as fused alumina is ground to pass through a 200 mesh screen. Preferably 29 parts by weight of the milled zircon, 20 parts of fused alumina and 50 parts by weight of the ferro-silicon are mixed together with about 6 cc. of ortho-phosphoric acid per 100 grams of the powdered mixture to make a soupy paste. Where low temperature hardening is required (under 700° F.) one part by weight of aluminum hydrate powder is added.

The material is allowed to digest and dry down for a period of 24 to 36 hours at a temperature in the neighborhood of boiling water. In the later stages of the drying down process it is preferable to apply a strong vacuum (20" or more) to pull out entrapped air bubbles in the soupy mixture. This has the effect of giving a very dense refractory body.

The wet mixture is cast into various shapes or the semi-wet mixture may be rammed. Nichrome or other resistance wire may be incorporated into the refractory.

When aluminum hydrate powder is present the material may be hardened by heat treating around 600° F. and placed in regular use without further treatment. Without the aluminum hydrate, high temperature hardening around 1800° F. is required before use.

It is contemplated that various modifications of the above process may be made without departing from the spirit or scope of the claims. For some purposes vacuum treating the product is an unnecessary refinement. Instead of adding the phosphoric acid all at once to the powdered mixture, superior results may be obtained by adding it in portions, one-half being added to the powder, then digesting, and then adding the remainder of the acid. No material difference is obtained by varying the phosphoric acid within a few per cent, viz. 4 to 6%, and in place of ortho-phosphoric acid, $P_2O_5$ or other forms of phosphate, or any material forming a non-volatile and electrically resistant compound with the silicon and the other metal components may be used.

Observation of the fired product indicates that the phosphoric acid reacts with the zircon, alumina and ferro-silicon to form a mixture of zirconium, aluminum, iron, silicon, phosphates with the silicon phosphate predominating, the phosphates forming a film around the various refractory particles increasing the electrical resistance without materially affecting the thermal conductivity.

Neither is the invention limited to the exact proportions stated. The non-metallic portion should, however, be a substantial proportion of the metallic portion in order to maintain the crushing strength of the composition at high temperatures. The preferred embodiment of the present invention does not fail at 2550° F. under a crushing load of 550 lbs. per square inch. It is to be understood that more or less alumina may be partially substituted particularly for the zircon and to some extent for the ferro-silicon, but the proportions given are particularly suitable and stable for refractory use at high temperatures, and in general variations of over plus or minus 5% should not be made from the preferred material.

Having thus described the invention, what is claimed as new is:

1. A composition comprising zircon, electrically fused refractory compounds, and silicon bonded together by the reaction products of phosphoric acid therewith.

2. A composition comprising zircon, silicon and a fused refractory from the group consisting of alumina, silicon carbide, zirconia, and chromium oxide, said materials being bonded together by the reaction products of phosphoric acid therewith.

3. A composition comprising zircon, fused alumina, and ferro-silicon bonded together by the reaction product of phosphoric acid therewith.

4. A composition comprising approximately equal parts of a mixture of zircon and fused alumina with silicon bonded together by the reaction products of phosphoric acid therewith.

5. A composition comprising approximately 29 parts by weight of zircon, 20 parts by weight of fused alumina and 50 parts by weight of 75% ferro-silicon bonded together by the reaction products of phosphoric acid therewith.

6. The method of making a refractory composition comprising mixing ground silicon with a ground electrically fused refractory compound and milled zircon, and treating said mixture with phosphoric acid.

7. The method of making a refractory composition comprising mixing ground silicon with ground fused alumina and milled zircon, and treating said mixture with phosphoric acid reacting with the elements of said mixture to form products none of which are volatile at ordinary refractory firing temperatures.

8. The method of making a refractory composition comprising mixing ground ferro-silicon with ground fused alumina, powdered aluminum hydrate and ground zircon, and treating said mixture with phosphoric acid.

9. The method of making a refractory composition comprising mixing ground ferro-silicon, ground fused alumina, ground zircon with phosphoric acid and water, drying the mixture, and during the drying stage placing the mixture under vacuum.

10. The method of making a refractory composition comprising mixing 50% ground silicon, 20% ground fused refractory compounds, 29% ground zircon, adding about 3% phosphoric acid, digesting the mixture, adding about 3% more of phosphoric acid, and hardening the mixture by heat.

JOHN D. MORGAN.
R. E. LOWE.